United States Patent
Abdulaal et al.

(10) Patent No.: US 11,797,353 B2
(45) Date of Patent: Oct. 24, 2023

(54) METHOD AND SYSTEM FOR PERFORMING WORKLOADS IN A DATA CLUSTER

(71) Applicant: EMC IP Holding Company LLC, Hopkinton, MA (US)

(72) Inventors: Omar Mohammed Mohammed Abdulaal, Cairo (EG); Shary George Waheeb Beshara, Cairo (EG); Mohamed Shaaban, Cairo (EG); Ahmad Refaat Abdelfadeel Ahmad ElRouby, Cairo (EG); Omar Mahmoud Ahmed Kamal Ibrahim, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 419 days.

(21) Appl. No.: 17/083,443

(22) Filed: Oct. 29, 2020

(65) Prior Publication Data
US 2022/0138019 A1 May 5, 2022

(51) Int. Cl.
*G06F 9/50* (2006.01)
*G06N 3/08* (2023.01)
*G06N 3/045* (2023.01)

(52) U.S. Cl.
CPC ............ *G06F 9/5083* (2013.01); *G06F 9/505* (2013.01); *G06F 9/5044* (2013.01); *G06N 3/045* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,868,927 | B1* | 12/2020 | Kodimer | H04N 1/00395 |
| 11,003,988 | B2* | 5/2021 | Hsieh | G06N 3/08 |
| 11,307,546 | B2* | 4/2022 | Xu | G05B 13/0265 |
| 2006/0074970 | A1* | 4/2006 | Narayanan | G06F 11/3476 |
| | | | | 707/999.102 |
| 2018/0144243 | A1* | 5/2018 | Hsieh | G06F 30/20 |
| 2018/0218038 | A1* | 8/2018 | Katahira | G06F 16/24542 |
| 2019/0042386 | A1* | 2/2019 | Barczak | G06F 3/0632 |
| 2019/0325108 | A1* | 10/2019 | Turek | G06F 30/327 |
| 2019/0362239 | A1* | 11/2019 | Runkier | G05B 19/41865 |
| 2020/0082247 | A1* | 3/2020 | Wu | G06N 3/045 |

(Continued)

*Primary Examiner* — Adam Lee
(74) *Attorney, Agent, or Firm* — Chamberlain, Hrdlicka, White, Williams, & Aughtry

(57) ABSTRACT

Techniques described herein relate to systems, methods, and non-transitory computer readable mediums for performing workloads on hardware configurations. The method includes determining compliant hardware configurations of the data cluster using workload features associated with the workload, hardware specification information associated with hardware of data nodes of a data cluster, and a first machine learning model; generating performance predictions associated with the compliant hardware configurations using the workload features, a portion of the hardware specification information associated with the compliant hardware configurations, and a second machine learning model; and generating a recommendation using the performance predictions, and the recommendation specifies a hardware configuration of the compliant hardware configurations. The workload is performed using the recommendation.

20 Claims, 11 Drawing Sheets

(56) References Cited

U.S. PATENT DOCUMENTS

| | | | |
|---|---|---|---|
| 2020/0293503 A1* | 9/2020 | P | G06N 5/04 |
| 2020/0293835 A1* | 9/2020 | Doni | G06N 20/00 |
| 2020/0342068 A1* | 10/2020 | Cai | G06F 30/20 |
| 2020/0348979 A1* | 11/2020 | Calmon | G06F 9/5027 |
| 2020/0363791 A1* | 11/2020 | Sakumiya | G05B 19/41865 |
| 2021/0004409 A1* | 1/2021 | Zamora Duran | G06F 16/908 |
| 2021/0012239 A1* | 1/2021 | Arzani | H04L 43/50 |
| 2021/0021469 A1* | 1/2021 | Sondur | H04L 41/0823 |
| 2021/0124510 A1* | 4/2021 | Ferreira | G06F 3/0653 |
| 2021/0125054 A1* | 4/2021 | Ban | H04N 21/4666 |
| 2021/0149744 A1* | 5/2021 | Sharma | G06F 11/3006 |
| 2021/0216850 A1* | 7/2021 | Alshawabkeh | G06F 30/27 |
| 2021/0223982 A1* | 7/2021 | Prado | G06F 3/0653 |
| 2021/0224093 A1* | 7/2021 | Fu | G06F 9/5072 |
| 2021/0224178 A1* | 7/2021 | Singh | G06F 9/44505 |
| 2021/0232332 A1* | 7/2021 | O'Halloran | G06N 20/00 |
| 2021/0303582 A1* | 9/2021 | Boaz Costa Leite | G06F 7/14 |
| 2021/0320936 A1* | 10/2021 | Wright | G06F 8/65 |
| 2022/0004553 A1* | 1/2022 | Corvinelli | G06F 16/24549 |
| 2022/0137985 A1* | 5/2022 | Murugan | G06F 8/65 713/100 |
| 2022/0171373 A1* | 6/2022 | Chau | C23C 14/54 |

* cited by examiner

METHOD AND SYSTEM FOR PERFORMING WORKLOADS IN A DATA CLUSTER

BACKGROUND

Devices may generate information based on existing information. For example, devices may obtain information and derive information based on the obtained information. In order to use this information, the information may need to be processed using one or more algorithms executing on one or more hardware platforms. Traditionally an ad hoc mechanism is used to determine which hardware platform of the hardware platforms to use to process the aforementioned information. This ad hoc approach results in poor resource allocation and utilization on the hardware platforms.

SUMMARY

In general, in one aspect, the invention relates to a method performed to perform workloads. The method includes obtaining, by the recommendation engine, a workload; generating workload features associated with the workload; obtaining hardware specification information associated with hardware of data nodes of a data cluster; determining compliant hardware configurations of the data cluster using the workload features, the hardware specification information, and a first machine learning model; generating performance predictions associated with the compliant hardware configurations using the workload features, a portion of the hardware specification information associated with the compliant hardware configurations, and a second machine learning model; generating a recommendation using the performance predictions, and the recommendation specifies a hardware configuration of the compliant hardware configurations; sending the recommendation to the data cluster; and initiating the performance of the workload on the hardware configuration.

In general, in one aspect, the invention relates to a system that is used to perform workloads. The system includes a data cluster that includes data nodes, which a data node of the data nodes includes a processor and memory; and a recommendation engine, operatively connected to the data cluster, that includes a second processor and second memory. The recommendation engine obtains a workload; generates workload features associated with the workload; obtains hardware specification information associated with hardware of the data nodes; determines compliant hardware configurations of the data cluster using the workload features, the hardware specification information, and a first machine learning model; generates performance predictions associated with the compliant hardware configurations using the workload features, a portion of the hardware specification information associated with the compliant hardware configurations, and a second machine learning model; generates a recommendation using the performance predictions, wherein the recommendation specifies a hardware configuration of the compliant hardware configurations; sends the recommendation to the data node, wherein the recommendation specifies the data node; and initiates the performance of the workload on the hardware configuration on the data node.

In general, in one aspect, the invention relates to a non-transitory computer readable medium which includes computer readable program code, which when executed by a computer processor enables the computer processor to perform a method for performing workloads. The method includes obtaining, by the recommendation engine, a workload; generating workload features associated with the workload; obtaining hardware specification information associated with hardware of data nodes of a data cluster; determining compliant hardware configurations of the data cluster using the workload features, the hardware specification information, and a first machine learning model; generating performance predictions associated with the compliant hardware configurations using the workload features, a portion of the hardware specification information associated with the compliant hardware configurations, and a second machine learning model; generating a recommendation using the performance predictions, and the recommendation specifies a hardware configuration of the compliant hardware configurations; sending the recommendation to the data cluster; and initiating the performance of the workload on the hardware configuration.

DETAILED DESCRIPTION

Figure 1A:
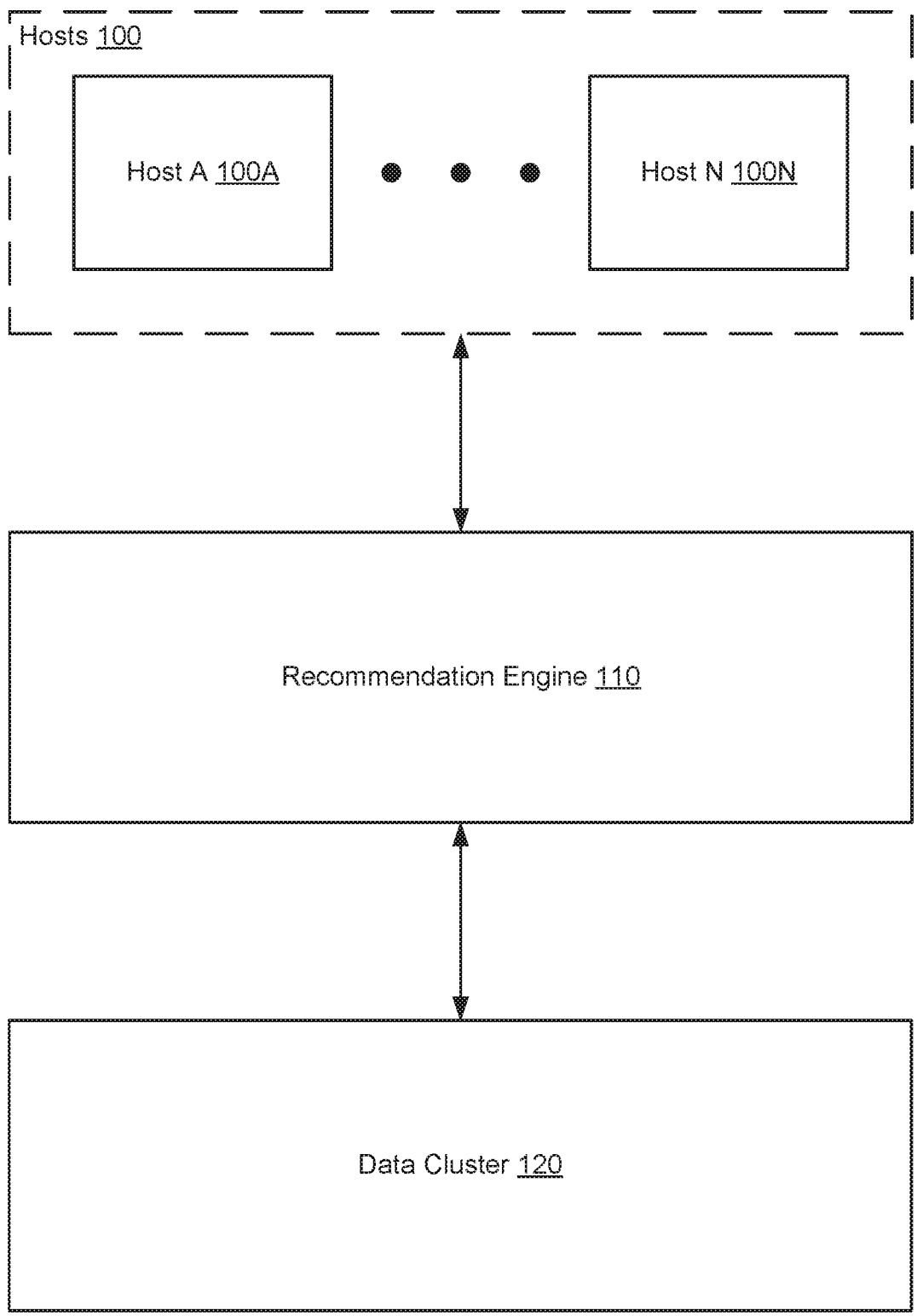
FIG. 1A shows a diagram of a system in accordance with one or more embodiments of the invention.

Specific embodiments of the invention will now be described in detail with reference to the accompanying figures. Like elements in the various figures are denoted by like reference numerals for consistency. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Workloads involving the training of deep learning models are becoming increasingly complex, ultimately demanding more hardware resources. This provides a challenge for a scheduler to allocate adequate hardware resources of data nodes of a data cluster for the workloads given limited to no information about the hardware resource requirements associated with the workloads. Traditional schedulers rely on either a static approach or a dynamic approach to allocate hardware resources for workloads. The static approach may include filtering data nodes based on hardware resource availability and user-defined hardware requirements, and placing workloads in data nodes that are available and rescheduling the workload to other data nodes that are available. The dynamic approach may include randomly placing workloads on data nodes and monitoring the performance of the workload to predict future performances of similar workloads and to reschedule the workloads on different data nodes.

These scheduling approaches may be suitable for generic workloads; however, for workloads including the training of deep learning models, inefficiencies arise. For the static approach, manually specifying resource requirements may generate unnecessary overhead on the user. For the dynamic approach, rescheduling workloads may be inefficient, as it would interrupt the training process.

To address the above issues, one or more embodiments of the invention relate to a system and method for generating and providing recommendations, by a recommendation engine, on which hardware to perform workloads associated with training deep learning models. Embodiments of the invention relate to extracting workload features from workloads associated with deep learning training jobs, and using the workload features in combination with several machine learning models to generate workload performance and time predictions on various hardware configurations of data nodes in a data cluster. The recommendations may be used by any scheduler associated with any type of environment. Additionally, the embodiments of the invention reduce user overhead and efficient scheduling of workloads. Moreover, feedback metrics may be used by the recommendation engine to improve the accuracy of workload performance times, and therefore, continually improve the accuracy of the recommendations.

A recommendation engine may provide a workload to the recommendation engine. In response to obtaining the workload, the recommendation engine extracts workload features associated with the workload from the workload. The recommendation engine may obtain hardware specification information, which may specify the types of hardware and the hardware characteristics of the hardware included in data nodes of a data cluster.

The recommendation engine may apply a first machine learning model to the workload features and the hardware specification information to obtain compliant hardware configurations. Compliant hardware configurations may include hardware configuration that meet workload requirements. Non-compliant hardware configurations may include hardware configurations that do not meet workload requirements.

The recommendation engine may then apply the compliant hardware configurations, the hardware specification information associated with the compliant hardware configurations, and the workload features to a second machine learning model to generate predictions of the times it would take to perform the workload on the compliant hardware configurations. The recommendation engine may identify a subset of compliant hardware configurations that meet time requirements specified by the user.

The recommendation engine may rank the subset of compliant hardware configurations based on a user preference. The hardware configuration of the subset of compliant hardware configurations that best fits the user preference is identified as the recommended hardware configuration. The recommendation engine may generate a recommendation. The recommendation may include a data node identifier and one or more hardware component identifiers. The recommendation engine may send the recommendation and the workload to a scheduler.

The scheduler may then schedule the performance of the workload on the data node and hardware component(s) specified by the recommendation. A watcher may monitor the performance of the workload and generate feedback training data based on the performance of the workload. The watcher may send the feedback training data to the recommendation engine, which may update the second machine learning model based on the feedback training data.

Additional detail about one or more embodiments of the invention is provided in the following description and the accompanying figures.

Turning to the figures, FIG. 1A shows a diagram of a system in accordance with one or more embodiments of the invention. The system may include hosts (100), a recommendation engine (110), and a data cluster (120). The hosts (100) may include one or more hosts, e.g. host A (100A) and host N (100N). The recommendation engine (110) may include the functionality to perform the methods depicted in FIGS. 3A and 3B. The system may include additional, fewer, and/or different components without departing from the invention. Each component may be operatively connected to any of the other components via any combination of wired and/or wireless connections. Each of the aforementioned components is discussed below.

The hosts (100) may use the recommendation services obtained from the recommendation engine (110) and the computer implemented services obtained from the data cluster (120). The hosts may be used by a user of the system to generate and provide workloads to the recommendation engine (110) and the data cluster (120). The user may be, for example, a data scientist without departing from the invention. The user of the hosts (100) may provide user preferences and user requirements to the recommendation engine (110). The user preferences may specify how hardware configurations should be ranked by the recommendation engine (110) (e.g., least amount of computational resources used, fastest performance of the workload, etc.). User requirements may specify an amount of time a user requires the workload to be performed on a hardware configuration. User requirements may include other and/or additional requirements regarding the performance of the workload on hardware configurations without departing from the invention.

Figure 5:
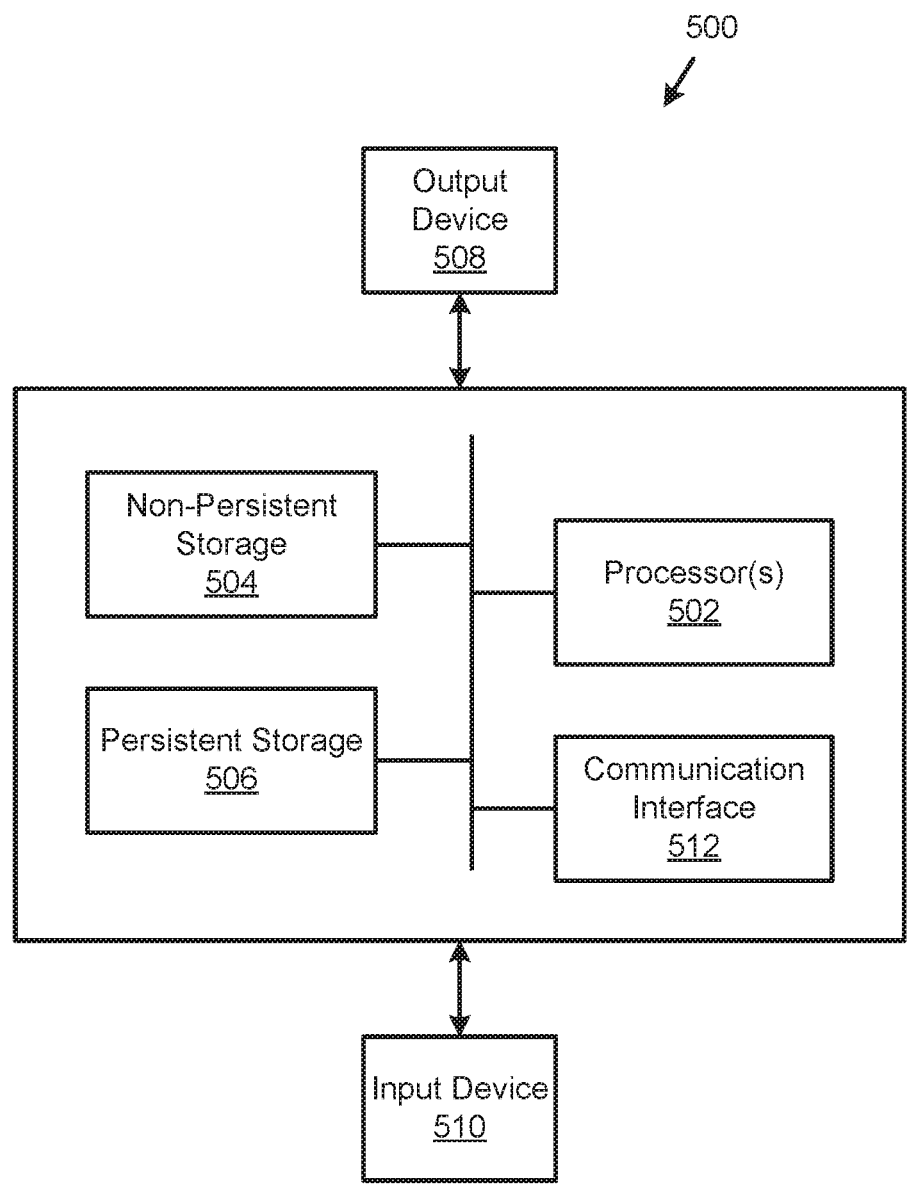
FIG. 5 shows a diagram of a computing device in accordance with one or more embodiments of the invention.

In one or more embodiments of the invention, the hosts (100) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a host (e.g., 100A) described throughout this application.

In one or more embodiments of the invention, the hosts (100) are implemented as logical devices. A logical device may utilize the computing resources of any number of computing devices and thereby provide the functionality of a host (e.g., 100A) described throughout this application.

In one or more embodiments of the invention, the recommendation engine (110) includes the functionality to generate recommendations that specify hardware configurations to perform workloads. The recommendation engine may include the functionality to perform the methods depicted in FIGS. 3A and 3B. The recommendation engine (110) may include other and/or additional functionality without departing from the invention. For additional information regarding the recommendation engine (110), refer to FIG. 1B.

In one or more embodiments of the invention, the recommendation engine (110) is implemented as a computing device (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of recommendation engine (e.g., 110) described throughout this application.

In one or more embodiments of the invention, the recommendation engine (110) is implemented as a logical device. A logical device may utilize the computing resources of any number of computing devices and thereby provide the functionality of the recommendation engine (110) described throughout this application.

In one or more embodiments of the invention, the data cluster (120) includes the functionality to perform workloads. The data cluster (120) may include any number of data nodes (discussed below) that may perform workloads using hardware configurations. Hardware configurations may include combinations of hardware components included in a data node. The data cluster (120) may include other and/or additional functionality without departing from the invention. For additional information regarding the data cluster (120), refer to FIG. 1C.

Figure 1B:
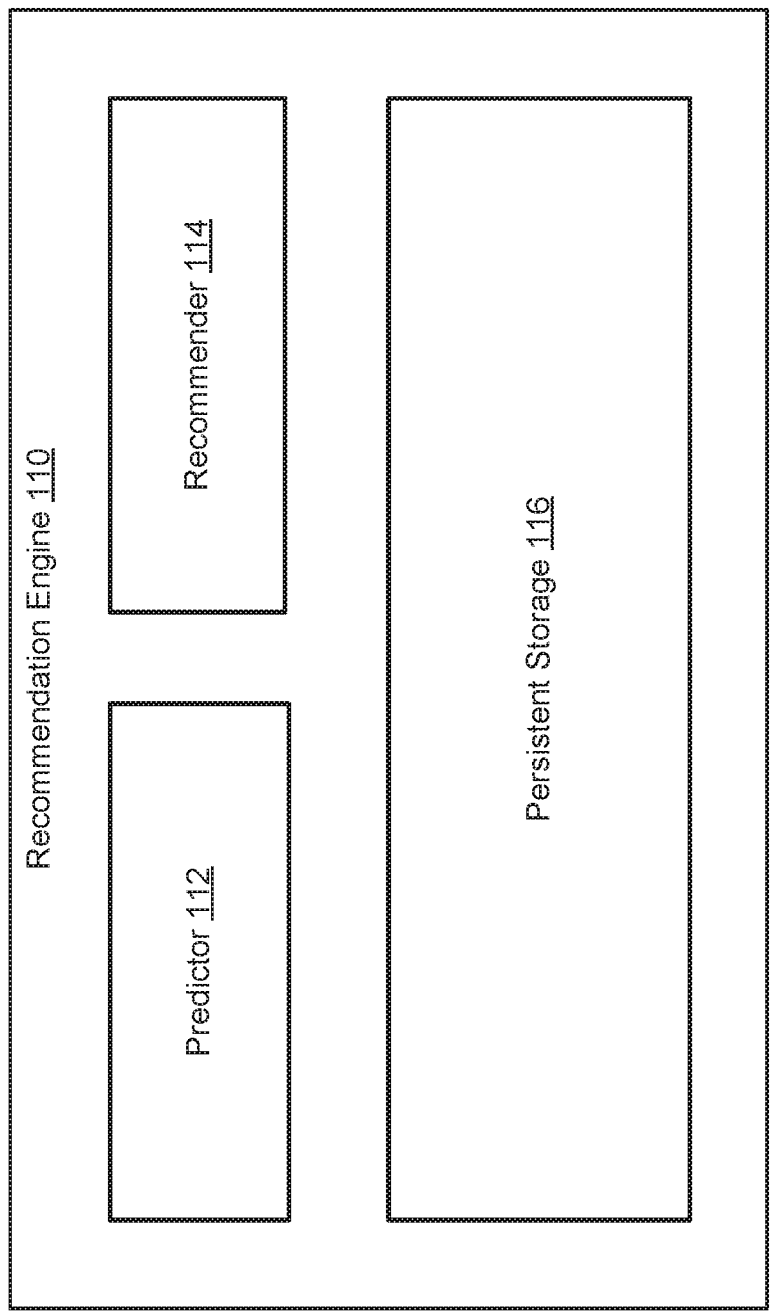
FIG. 1B shows a diagram of a recommendation engine in accordance with one or more embodiments of the invention.

FIG. 1B shows a diagram of a recommendation engine in accordance with one or more embodiments of the invention. The recommendation engine (110) may be an embodiment of the recommendation engine (110, FIG. 1A) discussed above. As discussed above, the recommendation engine (110) may include the functionality to generate recommendations that specify hardware configurations to perform workloads. To provide the aforementioned functionality, the recommendation engine (110) may include a predictor (112), recommender (114), and persistent storage (116). The recommendation engine (110) may include additional, fewer, and/or different components without departing from the invention. Each of the aforementioned components is discussed below.

The predictor (112) may include the functionality to generate workload features based on the workload. The predictor (112) may also include the functionality to obtain hardware specification information (see e.g., FIG. 2B) from the data cluster or another third party component not illustrated in the system depicted in FIG. 1A. The predictor (112) may include the functionality to use the hardware specification information, the workload features, and a first machine learning model to generate compliant hardware configurations. The first machine learning model may be a neural network classifier. The first machine learning model may be another type of machine learning model without departing from the invention. The compliant hardware configurations may be hardware configurations that meet workload requirements (e.g., includes sufficient memory to perform workload). The predictor (112) may also include the functionality to generate performance time predictions using the compliant hardware configurations, the hardware specification information, the workload features, and a second machine learning model. The second machine learning model may be a neural network regression model. The second machine learning model may be another type of machine learning model without departing the invention. The predictor (112) may also include the functionality to update the second machine learning model based on feedback training data obtained from the data cluster (e.g., 120, FIG. 1A). The predictor (112) may include other and/or additional functionality without departing from the invention.

In one or more embodiments of the invention, the predictor (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the predictor (112) described throughout this application.

In one or more embodiments of the invention, the predictor (112) is implemented as computer instructions, e.g., computer code, stored on a persistent storage (e.g., 116) that when executed by a processor of the recommendation engine (110) causes the recommendation engine (110) to provide the functionality of the predictor (112) described throughout this application.

The recommender (114) may include the functionality to identify sets of compliant hardware configurations that meet one or more user requirements. Additionally, the recommender (114) may include the functionality to rank the sets of compliant hardware configurations based on a user preference. The recommender (114) may also generate a recommendations based on the ranking of the sets of compliant hardware configurations. The recommender (114) may also provide the recommendations to the data cluster (120, FIG.

1A). The recommender may include other and/or additional functionality without departing from the invention.

In one or more embodiments of the invention, the recommender (114) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the recommender (114) described throughout this application.

In one or more embodiments of the invention, the recommender (114) is implemented as computer instructions, e.g., computer code, stored on a persistent storage (e.g., 116) that when executed by a processor of the recommendation engine (110) causes the recommendation engine (110) to provide the functionality of the recommender (114) described throughout this application.

The persistent storage (116) may store data. The data stored in persistent storage (116) may include data generated and/or used by the recommendation engine (110) and the aforementioned components of the recommendation engine (e.g., 112, 114) to generate recommendations. The data stored in persistent storage (116) may include workloads, workload features, hardware specification information, the first machine learning model, hardware configurations, compliant hardware configurations, the second machine learning model, performance predictions, recommendations, and the feedback training data. The persistent storage (116) may store other and/or additional data without departing from the invention. For additional information regarding the workload features, the hardware specification information, and the recommendations, refer to FIGS. 2A-2C respectively.

The persistent storage (116) may be implemented using physical storage devices and/or logical storage devices. The physical storage devices may include any combination of hard disk drives, solid state disk drives, tape drives, and/or any other physical storage mediums for the storage of data without departing from the invention.

The logical storage devices (e.g., virtualized storage) may utilize any quantity of hardware storage resources of any number of computing devices for storing data. For example, the persistent storage (116) may utilize portions of any combination of hard disk drives, solid state disk drives, tape drives, and/or any other physical storage medium of any number of computing devices.

Figure 1C:
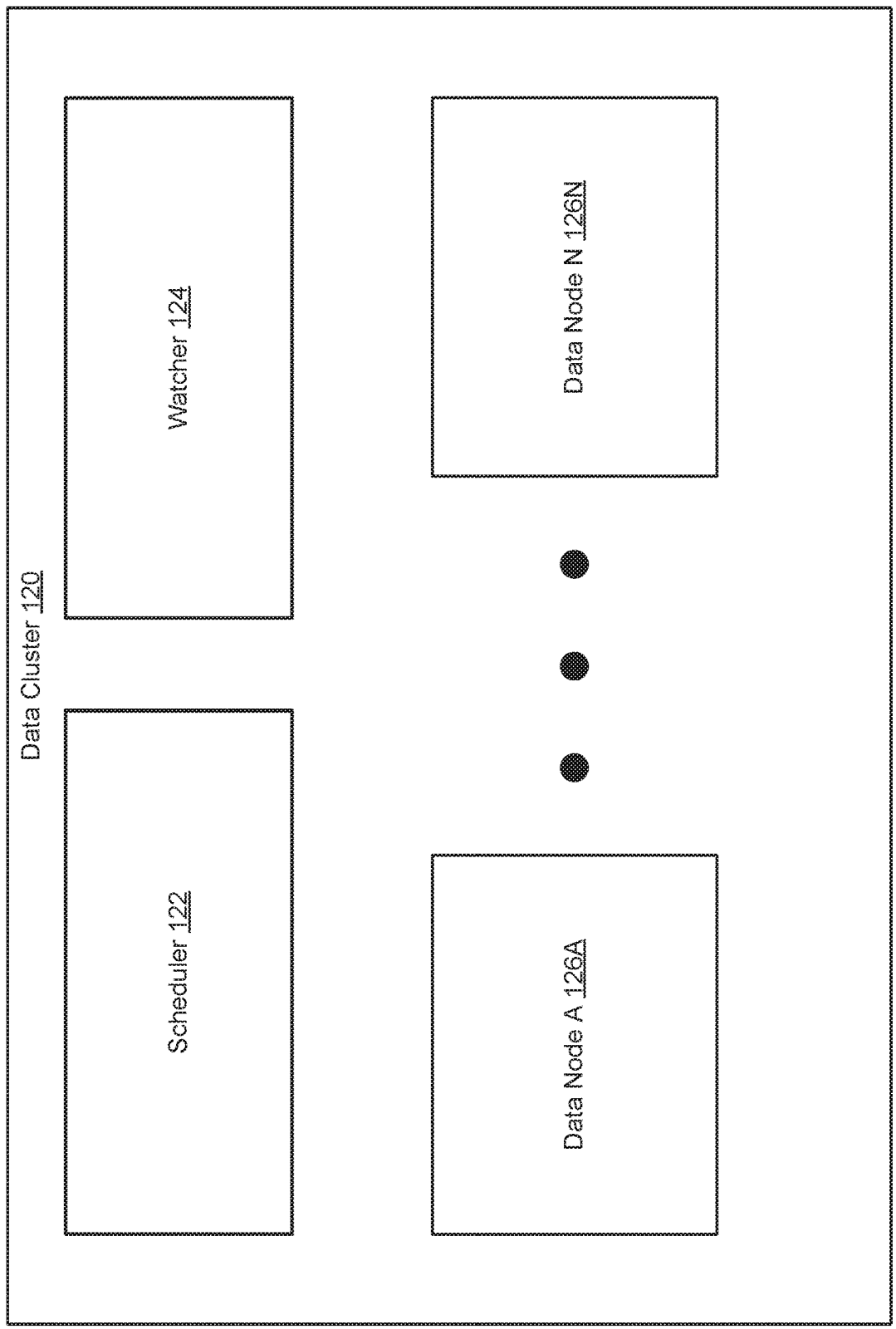
FIG. 1C shows a diagram of a data cluster in accordance with one or more embodiments of the invention.

FIG. 1C shows a diagram of a data cluster in accordance with one or more embodiments of the invention. The data cluster (120) may be an embodiment of the data cluster (120, FIG. 1A) discussed above. As discussed above, the data cluster (120) may include the functionality to perform workloads. To provide the aforementioned functionality, the data cluster (120) may include a scheduler (122), a watcher (124), and one or more data nodes, e.g., data node A (126A) and data node N (126N). The data cluster (120) may include additional, fewer, and/or different components without departing from the invention. Each of the aforementioned components is discussed below.

The scheduler (122) may include the functionality to schedule the performance of workloads based on recommendations obtained from the recommendation engine (110, FIG. 1A). In other words, the scheduler (122) may assign a workload to a data node (e.g., 126A) and specific hardware components of the data node (e.g., 126A) specified by a recommendation obtained from the recommendation engine (110, FIG. 1A). The scheduler (122) may also initiate the performance of workloads on the assigned data nodes (126A, 126N) and hardware components. The scheduler (122) may include other and/or additional functionality without departing from the invention.

In one or more embodiments of the invention, the scheduler (122) is implemented as a computing device (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of scheduler (e.g., 122) described throughout this application.

In one or more embodiments of the invention, the scheduler (122) is implemented as a logical device. A logical device may utilize the computing resources of any number of computing devices (e.g., data node A (126A) and data node N (126N)) and thereby provide the functionality of the scheduler (122) described throughout this application.

In one or more embodiments of the invention, the scheduler (122) is a physical device of a data node (e.g., 126A). The physical device may include circuitry. The physical device may be, for example, a field-programmable gate array, application specific integrated circuit, programmable processor, microcontroller, digital signal processor, or other hardware processor. The physical device may be adapted to provide the functionality of the scheduler (122) described throughout this application.

In one or more embodiments of the invention, the scheduler (122) is implemented as computer instructions, e.g., computer code, stored on a persistent storage of a data node (e.g., 126A) that when executed by a processor of the data node (e.g., 126A) causes the data node (e.g., 126A) to provide the functionality of the scheduler (122) described throughout this application.

The watcher (124) may include the functionality to monitor the performance of workloads on the data nodes (e.g., 126A, 126N) and generate feedback training data based on the performance of the workload. The feedback training data may be one or more data structures that includes information regarding the performance of the workload. The information may include the time it took to perform the workload on the hardware configuration, the components used to perform the workload, and other and/or additional information regarding the performance of the workload without departing from the invention. The watcher (124) may provide the feedback training data to the recommendation engine (110, FIG. 1A). The watcher (124) may include other and/or additional functionality without departing from the invention.

In one or more embodiments of the invention, the watcher (124) is implemented as a computing device (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of watcher (124) described throughout this application.

In one or more embodiments of the invention, the watcher (124) is implemented as a logical device. A logical device may utilize the computing resources of any number of computing devices (e.g., data node A (126A) and data node N (126N)) and thereby provide the functionality of the watcher (124) described throughout this application.

In one or more embodiments of the invention, the watcher (124) is a physical device of a data node (e.g., 126A). The physical device may include circuitry. The physical device may be, for example, a field-programmable gate array, application specific integrated circuit, programmable processor, microcontroller, digital signal processor, or other hardware processor. The physical device may be adapted to provide the functionality of the watcher (124) described throughout this application.

In one or more embodiments of the invention, the watcher (124) is implemented as computer instructions, e.g., computer code, stored on a persistent storage of a data node (e.g., 126A) that when executed by a processor of the data node (e.g., 126A) causes the data node (e.g., 126A) to provide the functionality of the watcher (124) described throughout this application.

In one or more embodiments of the invention, the data nodes (126A, 126N) include the functionality to perform the workloads. The data nodes (126A, 126N) may include other and/or additional functionality without departing from the invention. For additional information regarding data nodes (e.g., 126A, 126N), refer to FIG. 1D.

In one or more embodiments of the invention, the data nodes (126A, 126N) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a data node (e.g., 126A) described throughout this application.

In one or more embodiments of the invention, the data nodes (126A, 126N) are implemented as logical devices. A logical device may utilize the computing resources of any number of computing devices and thereby provide the functionality of a data node (e.g., 126A) described throughout this application.

Figure 1D:
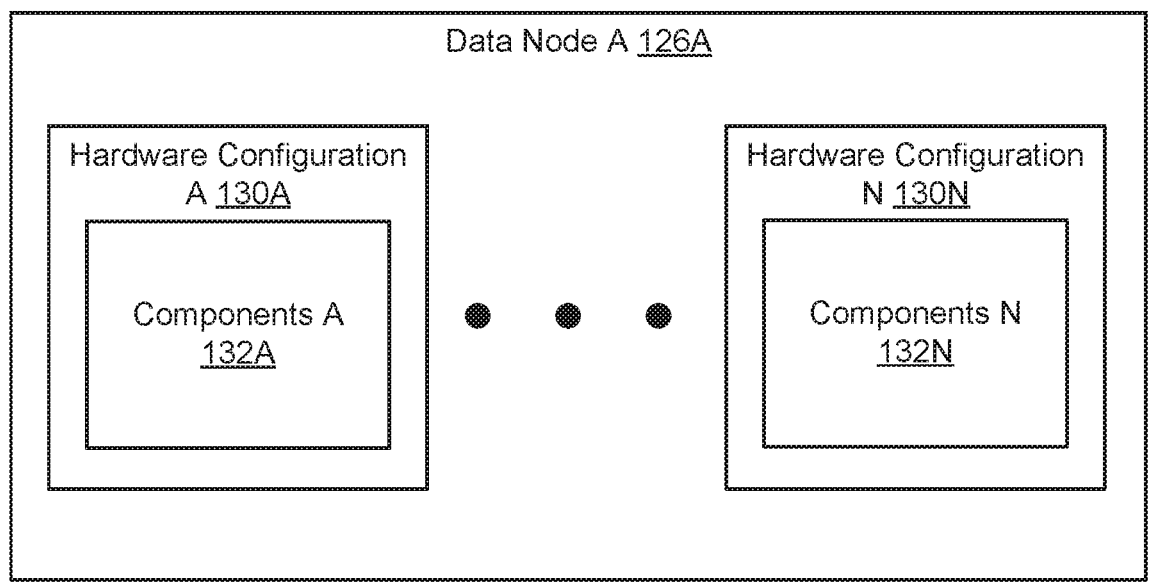
FIG. 1D shows a diagram of a data node in accordance with one or more embodiments of the invention.

FIG. 1D shows a diagram of a data node in accordance with one or more embodiments of the invention. Data node A (126A) may be an embodiment of a data node (e.g., 126A, 126N, FIG. 1C) discussed above. Data node A (126A) may include the functionality to perform workloads as discussed above. To provide the aforementioned functionality, data node A (126A) may include one or more hardware configurations, i.e., hardware configuration A (130A) and hardware configuration N (130N). Each hardware configuration (e.g., 130A, 130N) may include a unique combination of components (e.g., 132A, 132N) of data node A (126A, 126N). Hardware configuration A (130A) may include components A (132A) and hardware configuration N (130N) may include components N (132N). The components (e.g., 132A, 132N) may include central processing units (CPUs), graphical processing units (GPUs), memory, and other and/or additional types of computer hardware components without departing from the invention. There may be any number of hardware configurations (130A, 130N) that may include any number of combinations of any number of components (132A, 132N) without departing from the invention. Data node A (126A) may include other and/or additional components without departing from the invention.

Figure 2A:
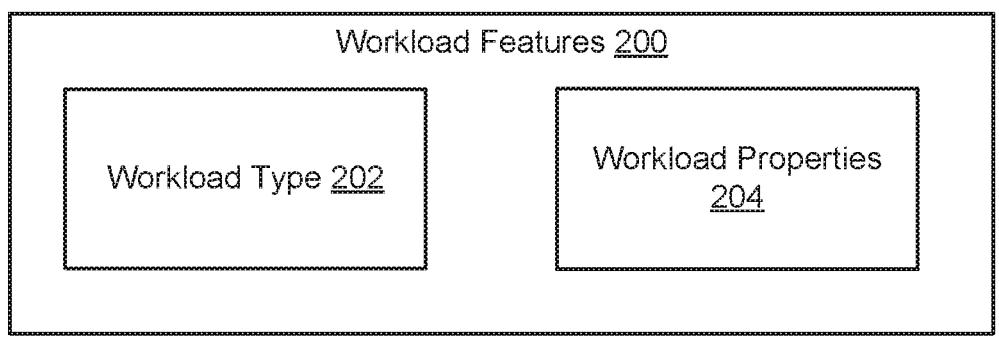
FIG. 2A shows a diagram of workload features in accordance with one or more embodiments of the invention.

FIG. 2A shows a diagram of workload features in accordance with one or more embodiments of the invention. The workload features (200) may be an embodiment of the workload features discussed above. The workload features (200) may be one or more data structures that may include information regarding a workload. The workload features (200) may include a workload type (202) and workload properties (204). The workload type (204) may indicate the type of deep learning model that is included in workload. For example, the workload type (204) may indicate that the deep learning model associated with the workload is a convolutional neural network. The workload type (204) may indicate another type of deep learning model without departing from the invention. The workload properties (204) may specify properties associated with the deep learning model included in the workload. The workload properties (204) may indicate the complexity of the deep learning model.

Continuing with the example above, for a convolutional neural network, the workload properties (204) may include number of convolution layers, number of dense layers, number of neurons per layer, number of filters, size of filters, input and output sizes, and other and/or additional properties associated with the deep learning model included in the workload without departing from the invention. The workload features (200) may include other and/or additional information regarding workloads without departing from the invention. The workload features (200) may be generated by the recommendation engine (110, FIG. 1A) and used to generate recommendations as discussed throughout this application. Workload features (200) may be generated for each workload obtained by the recommendation engine (110, FIG. 1A).

Figure 2B:
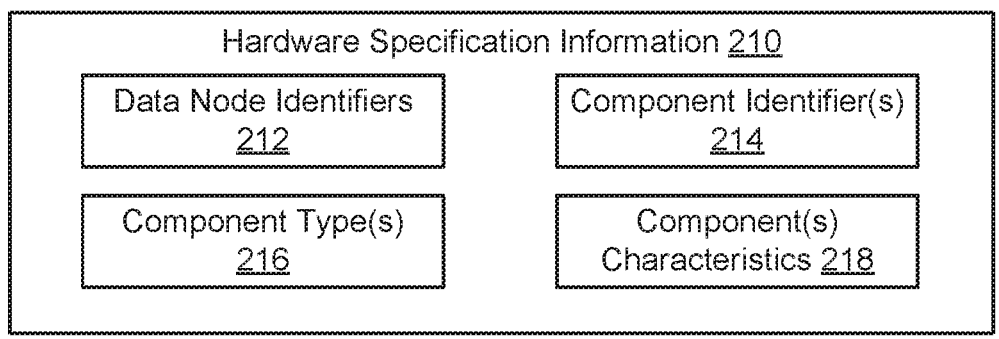
FIG. 2B shows a diagram of hardware specification information in accordance with one or more embodiments of the invention.

FIG. 2B shows a diagram of hardware specification information in accordance with one or more embodiments of the invention. The hardware specification information (210) may be an embodiment of the hardware specification information discussed above. The hardware specification information (210) may be one or more data structures that may include information associated with components (132A, 132N) of data nodes (126A, 126N, FIG. 1C) of the data cluster (120, FIG. 1A). The hardware specification information (210) may include data node identifiers (212), component identifiers (214), component types (216), and component characteristics (218). The data node identifiers (212) may be unique, global bit strings associated with data nodes that may be used to differentiate the data nodes (e.g., 126A, 126N, FIG. 1C).

Each data node identifier of the data node identifiers (212) may be associated with any number of component identifiers (214). The component identifiers (214) may be unique, global bit strings associated with components of data nodes that may be used to differentiate the components. Each component identifier of the component identifiers (214) may be associated with a component type (216). The component type(s) (216) may indicate the type of component. The component type(s) (216) may specify whether a component is a CPU, GPU, memory, or another and/or additional types of components without departing from the invention. Each component identifier (214) may also be associated with component characteristics (218).

The component(s) characteristics (218) may specify performance information of the associated component. The performance information may include, for example, clock speed, memory type, memory size, utilization, number of CPU cores, cache types, utilization, memory clock speed, maximum power limit, and other and/or additional performance information associated with the components without departing from the invention. The hardware specification information (210) may include other and/or additional information without departing from the invention. The hardware specification information (210) may be used by the recommendation engine (110, FIG. 1A) to generate recommendations as discussed throughout the application.

Figure 2C:
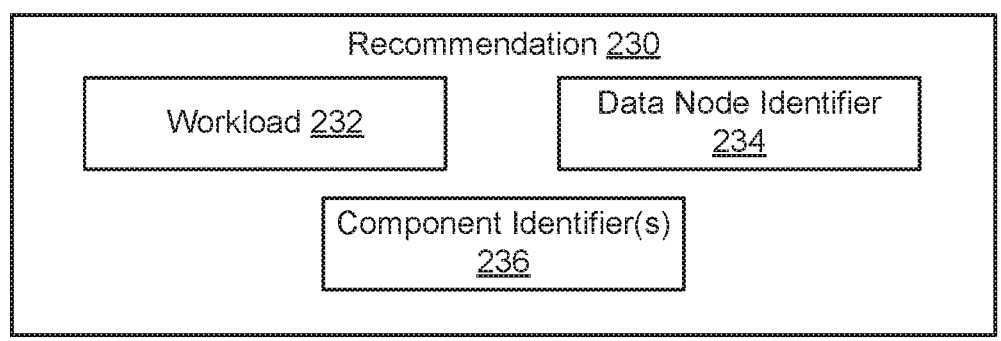
FIG. 2C shows a diagram of a recommendation in accordance with one or more embodiments of the invention.

FIG. 2C shows a diagram of a recommendation in accordance with one or more embodiments of the invention. The recommendation (230) may be an embodiment of the recommendations discussed above. The recommendation (230) may be one or more data structures that include a workload (232), a data node identifier (234), and one or more component identifiers (236). The data node identifier (234) and the component identifier(s) (236) may be associated with the hardware configuration the best fits the user preference as determined by the recommendation engine (110, FIG. 1A). For additional information regarding the data node identifier (234) and component identifier(s) (236) refer to FIG. 2B. The recommendation (230) may include other and/or additional components and/or information without departing from the invention. The recommendation (230) may be generated by the recommendation engine (110, FIG. 1A) and used by the scheduler (122, FIG. 1C) to assign workloads to hardware configurations.

Figure 3A:
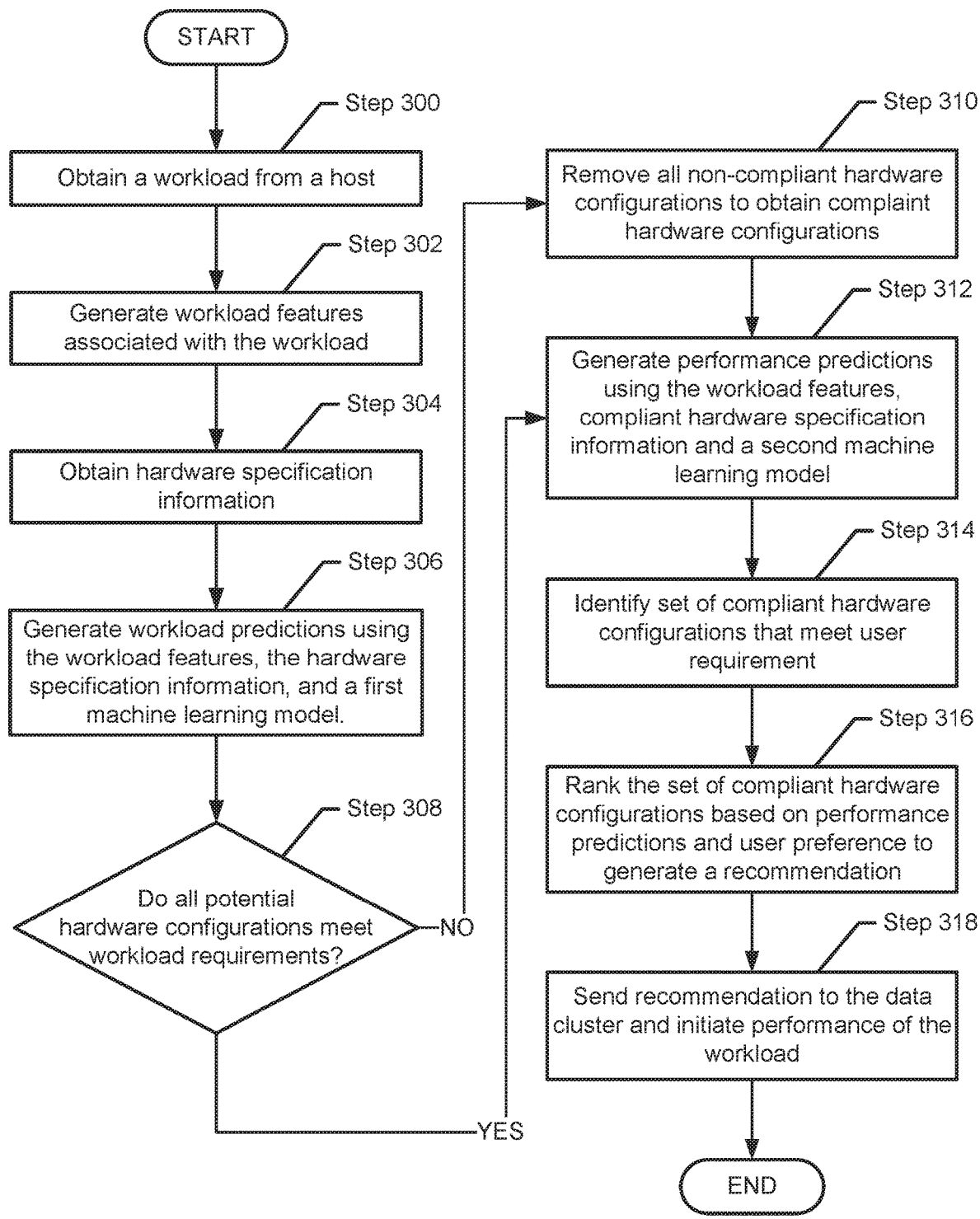
FIG. 3A shows a flowchart of a method for generating a recommendation in accordance with one or more embodiments of the invention.

FIG. 3A shows a flowchart of a method for generating a recommendation in accordance with one or more embodiments of the invention. The method shown in FIG. 3A may be performed by, for example, the recommendation engine (110, FIG. 1A). Other components of the system illustrated in FIG. 1A may perform all, or a portion, of the method of FIG. 3A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

Turning to FIG. 3A, in step 300, a workload is obtained from a host. In one or more embodiments of the invention, a user of a host sends a message to the recommendation engine. The message may include the workload. The message may also include a user requirement and a user preference. As discussed above, the user requirement may specify a maximum allowable time a user will allow a workload to be performed on a hardware configuration, and a user preference may be used by the recommendation engine to rank hardware configurations. The workload may be obtained from the host via other and/or additional methods without departing from the invention.

In step 302, workload features associated with the workload are generated. In one or more embodiments of the invention, the predictor of the recommendation engine generates a computation graph associated with the workload. The computation graph may a data structure that includes workload information associated with the workload. The workload information may include the structure of the workload, the mathematical functions of the workload, the input data used by the workload, and other and/or additional information associated with the workload without departing from the invention. The predictor of the recommendation engine may generate workload features based on the workload information included in the computation graph. Workload features associated with the workload may be generated via other and/or additional methods without departing from the invention.

In step 304, hardware specification information is obtained. In one or more embodiments of the invention, the recommendation engine sends a message to the data cluster. The message may include a request for hardware specification information. In response to obtaining the message, the data cluster, or a component of the data cluster, generates the hardware specification information, and sends the hardware specification information to the recommendation engine. The hardware specification information may be obtained via other and/or additional methods without departing from the invention.

In one or more embodiments of the invention, the recommendation engine sends a message to a third party device not depicted in the system of FIG. 1A. The message may include a request for hardware specification information. In response to obtaining the message, the third party device generates the hardware specification information, and sends the hardware specification information to the recommendation engine. The hardware specification information may be obtained via other and/or additional methods without departing from the invention.

In step 306, workload predictions are generated using the workload features, the hardware specification information, and a first machine learning model. In one or more embodiments of the invention, the predictor applies the first machine learning model to the hardware specification information and the workload features to generate the workload predictions. The first machine learning model may generate hardware configurations using the hardware specification information. The hardware configurations may be potential hardware configurations. The first machine learning model may also generate workload predictions associated with each hardware configuration using the workload features and the hardware specification information. The workload predictions may specify whether each generated hardware configuration has enough computational resources (e.g., memory space, computational capabilities, and other and/or additional computational resources without departing from the invention) to meet workload requirements and perform the workload. The workload prediction may specify either that a hardware configuration has enough computational resources to perform the workload, or that a hardware configuration does not have enough computational resources to perform the workload. Workload predictions may be generated using the workload features, the hardware specification information, and the first machine learning model via other and/or additional methods without departing from the invention.

In step 308, a determination is made as to whether all potential hardware configurations meet workload requirements. In one or more embodiments of the invention, the predictor uses the workload predictions to determine whether all potential hardware configurations meet workload requirements. There may be a flag, or a special bit, associated with each hardware configuration that when set, indicates that the hardware configuration associated with the flag meets workload requirements. The predictor may set or not set the flag for each hardware configuration based on the workload prediction associated with each hardware configuration. If a workload prediction indicates that a hardware configuration meets workload requirements, then the predictor may set the flag associated with the hardware configuration. If the workload prediction does not indicate that the hardware configuration meets workload requirements, then the predictor may not set the flag associated with the hardware configuration. If all flags associated with each hardware configuration are set, then the predictor may determine that all potential hardware configurations meet workload requirements. If all flags associated with each hardware configuration are not set, then the predictor may determine that all potential hardware configurations do not meet workload requirements. The determination may be made as to whether all potential hardware configurations meet workload requirements via other and/or additional methods without departing from the invention.

If it is determined that all potential hardware configurations meet workload requirements, then the method proceeds to step 312. If it is determined that all potential hardware configurations do not meet workload requirements, then the method proceeds to step 310.

In step 310, all non-compliant hardware configurations are removed to obtain compliant hardware configurations. In one or more embodiments of the invention, the predictor deletes the non-compliant hardware configurations to obtain the compliant hardware configurations. The predictor may determine that all hardware configurations associated with flags that are not set are non-compliant hardware configuration. The predictor may delete the hardware configurations associated with flags that are not set. All non-compliant hardware configurations may be removed to obtain compliant hardware configurations via other and/or additional methods without departing from the invention.

In step 312, performance predictions are generated using the workload features, compliant hardware specification information, and a second machine learning model. In one or more embodiments of the invention, the predictor applies the second machine learning model to the workload features and the compliant hardware specification information to generate performance predictions associated with each compliant hardware configuration. The compliant hardware specification information may include the hardware specification information associated with the compliant hardware configurations. The performance predictions may be numerical representations of the time it would take to perform the workloads on each compliant hardware configuration. The performance predictions may be associated with any unit of time (e.g., milliseconds, seconds, hours, days, etc.) without departing from the invention. The performance predictions may be generated using the workload features, compliant hardware specification information, and second machine learning model via other and/or additional methods without departing from the invention.

In step 314, a set of compliant hardware configurations that meet user requirements is identified. In one or more embodiments of the invention, the recommender of the recommendation engine compares the performance predictions with the user requirements to identify a set of compliant hardware configurations. The user requirements may specify a maximum allowable time a workload may be performed on a hardware configuration. Any other user requirements may be provided without departing from the invention. If a performance prediction of a hardware configuration exceeds the user requirements, then the recommender may delete the hardware configuration associated with the performance prediction. If the performance prediction does not exceed the user requirement, the recommender may not delete the hardware configuration associated with the performance prediction. The recommender may identify the remaining hardware configurations as the set of compliant hardware configurations. The recommender may delete any number, including zero, of hardware configurations to identify the set of compliant hardware configurations. If no compliant hardware configurations meet the user requirements, then the recommendation engine sends a notification to the host indicating that no hardware configurations meet the user requirements. The set of compliant hardware configurations that meet user requirements may be identified via other and/or additional methods without departing from the invention.

In step 316, the set of compliant hardware configurations is ranked based on the performance predictions and a user preference to generate a recommendation. In one or more embodiments of the invention, the recommender ranks the set of compliant hardware configurations based on the user preference. As discussed above, the user preference may specify how the set of compliant hardware configurations are to be ranked (e.g., lowest performance prediction, consumption of fewest resources, etc.). Any other user preference(s) may be provided without departing from the invention. The recommender may assign a rank to each hardware configuration of the set of compliant hardware configurations. The highest ranked compliant hardware configuration of the set of compliant hardware configurations may be the hardware configuration that best fits the user preference. The lowest ranked compliant hardware configuration may be the hardware configuration that least fits the user preference. The recommender may generate a recommendation that specifies the highest ranked hardware configuration using the highest ranked hardware configuration, the hardware specification information associated with the highest ranked hardware configuration, and the workload. The set of compliant hardware configurations may be ranked based on the performance predictions and the user preference to generate a recommendation via other and/or additional methods without departing from the invention.

In step 318, the recommendation is sent to the data cluster, and the performance of the workload is initiated. In one or more embodiments of the invention, the recommender of the recommendation sends a message to the scheduler of the data cluster. The message may include the recommendation and a request to perform the workload. In response to obtaining the recommendation, the scheduler may assign the workload to the hardware configuration of a data node specified in the recommendation, and the workload may be performed on the specified hardware configuration by the data node. The recommendation may be sent to the data cluster, and the performance of the workload may be initiated via other and/or additional methods without departing from the invention.

The method may end following step 318.

Figure 3B:
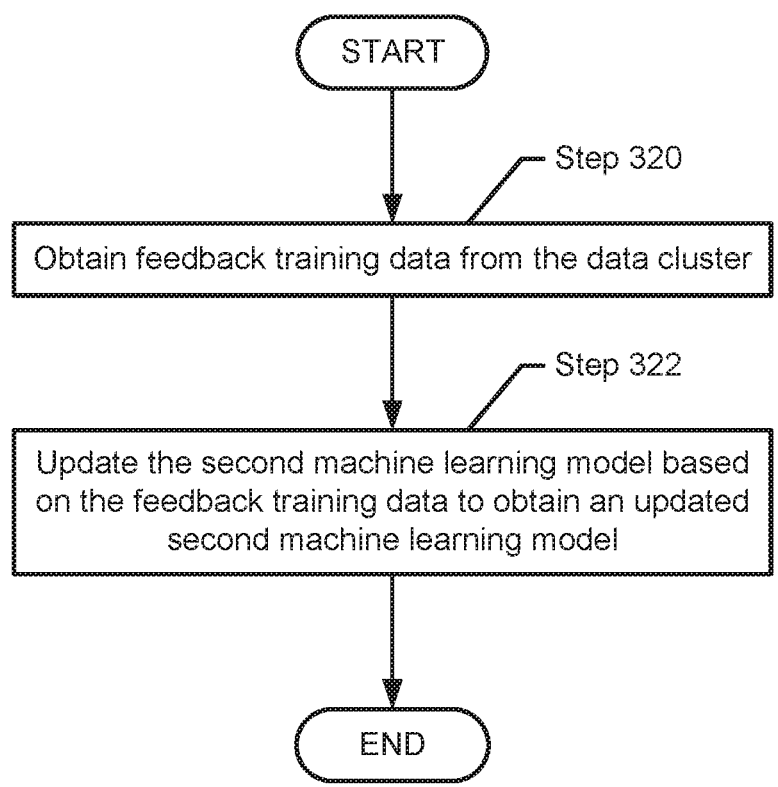
FIG. 3B shows a flowchart of a method for updating a second machine learning model in accordance with one or more embodiments of the invention.

FIG. 3B shows a flowchart of a method, performed by the recommendation engine, for an updated second machine learning model in accordance with one or more embodiments of the invention. The method shown in FIG. 3B may be performed by, for example, the recommendation engine (110, FIG. 1A). Other components of the system illustrated in FIG. 1A may perform all, or a portion, of the method of FIG. 3B without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

Turning to FIG. 3B, in step 320, feedback training data is obtained from the data cluster. In one or more embodiments of the invention, a message is obtained from the watcher of the data cluster. The message may include all or a portion of the feedback training data. As discussed above, the watcher may monitor the performance of workloads and generate feedback training data associated with the performance of the workloads. The watcher may send the feedback training data to the recommendation engine upon the conclusion of the performance of the workload and/or may sending training data periodically during the performance of the workload. The feedback training data may be obtained via other and/or additional methods without departing from the invention.

In step 322, the second machine learning model is updated based on the feedback training data to obtain an updated second machine learning model. In one or more embodiments of the invention, the predictor applies the second machine learning model to the feedback training data. The feedback training data may include the actual time it took to perform a workload, the features of the workload, the hardware specification information associated with the hardware configuration on which the workload was performed, prior feedback training data used to train the second machine learning model, and other and/or additional information associated with the performance of the workload without departing from the invention. As discussed above, the second machine learning model may be a neural network regression model. The predictor may apply the neural network regression model to the workload features and the hardware specification information, and adjust the weights of one or more neurons in the neural network regression model to generate performance predictions that better reflect the actual performance of the workload, resulting in the updated second machine learning model. The second machine learning model may be updated based on the feedback training data to obtain an updated second machine learning model via other and/or additional methods without departing from the invention.

The method may end following step 322.

Example

Figure 4:
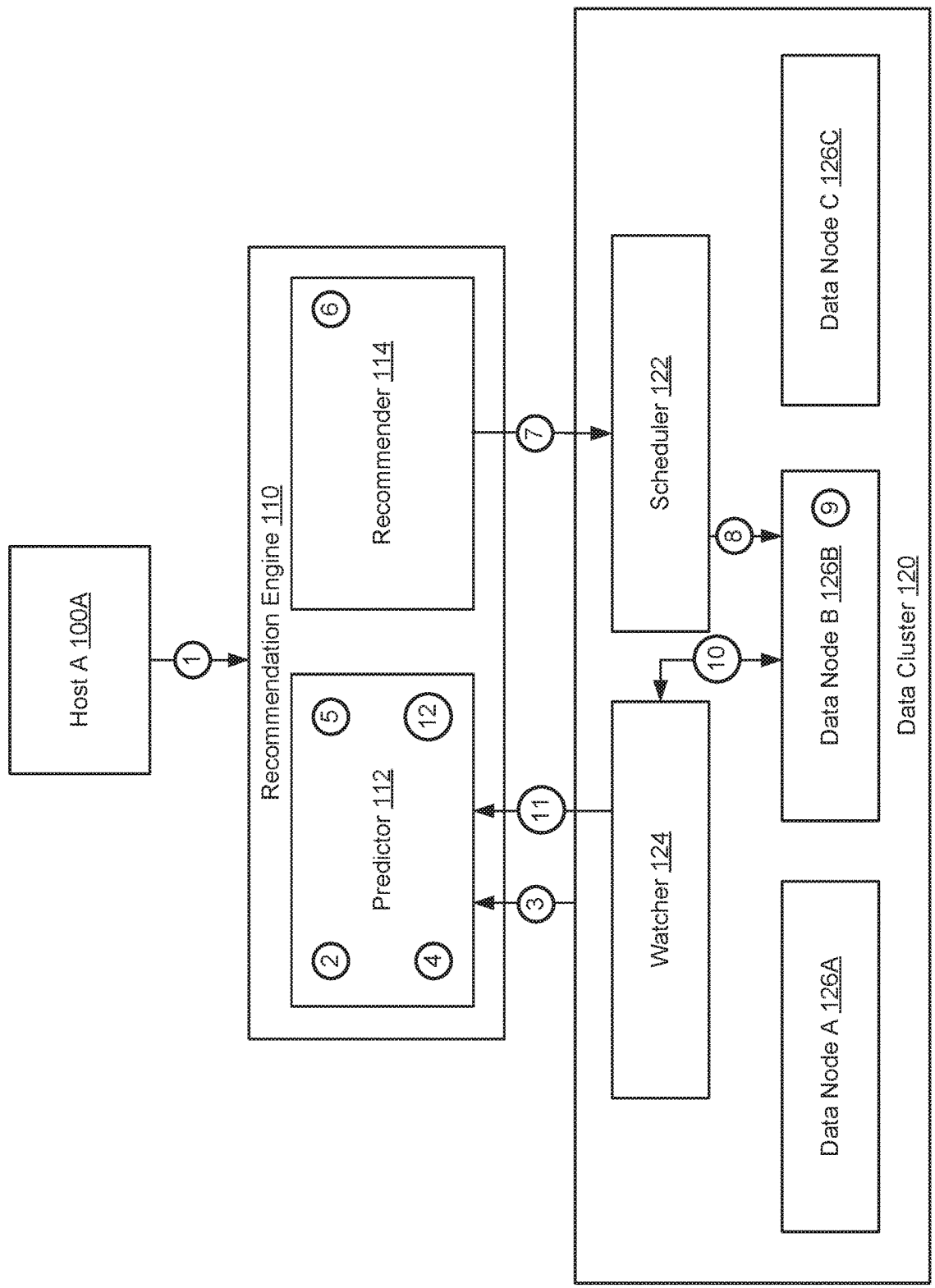
FIG. 4 shows a diagram of an example in accordance with one or more embodiments of the invention.

FIG. 4 shows a diagram of an example in accordance with one or more embodiments of the invention. The example is not intended to limit the invention. Consider a scenario in which a recommendation engine recommends a hardware configuration for performing a workload in a data cluster.

Turning to FIG. 4, the recommendation engine (110) obtains a workload from host A (100A) [1]. In response to obtaining the workload, the predictor (112) of the recommendation engine (110) generates workload features based on the obtained workload [2]. The predictor (112) of the recommendation engine (110) then hardware specification information from the data cluster (120) [3]. Based on the hardware specification information, data node A (126A) includes a CPU, a GPU, and a memory device, data node B (126B) includes a first CPU, a second CPU, a first GPU, a second GPU, and a memory device, and data node C (126C) includes a CPU, a first GPU, a second GPU, and a memory device (all not shown). The predictor (112) then generates compliant hardware configurations using the workload features, the hardware specification information, and a first machine learning model [4]. The first machine learning model is a neural network classifier. The compliant hardware configurations include two hardware configurations from data node B (126B), and one hardware configuration from data node C (126C). The first hardware configuration from data node B (126B) includes the first CPU, the second CPU, and the first GPU. The second hardware configuration from data node B (126B) includes the first CPU, the second CPU, the first GPU, and the second GPU. The hardware configuration from data node C (126C) includes the first CPU, the first GPU, and the second GPU.

After generating the compliant hardware configurations, the predictor (112) generates performance time predictions associated with each hardware configuration using the workload features, the hardware specification information associated with the compliant hardware configurations, and a second machine learning model [5]. The second machine learning model is a neural network regression model. The time prediction for the first hardware configuration of data node B (126B) is five seconds, the time prediction for the second hardware configuration of data node B (126B) is one second, and the time prediction for the hardware configuration from data node C (126C) is fifteen seconds. The recommender (114) then identifies a set of the compliant hardware configurations meets a user requirement and ranks them according to a user preference [6]. The user requirement specifies that the workload must be performed in under ten seconds. Therefore, the set of compliant hardware configurations includes both the hardware configurations included in data node B (126B) and excludes the hardware configuration from data node C (126C). The user preference states that the user wants the fastest performance time possible, therefore, the recommender (114) ranks the second hardware configuration from data node B (126B) higher than the first hardware configuration from data node B (126B).

The recommender (114) then generates a recommendation that specifies that the workload should be performed on data node B (126B) using the components of the second hardware configuration and sends the recommendation to the scheduler (122) of the data cluster (120) [7]. In response to obtaining the recommendation, the scheduler (122) assigns the workload to data node B (126B) and specifies that the workload is to use the components of the second hardware configuration of data node B (126B) [8]. Data node B (126B) then performs the workload using the components specified in the recommendation [9]. The actual performance time of the workload is two seconds. During and/or after the performance of the workload, the watcher (124) generates feedback training data associated with the performance of the workload [10]. The feedback training data includes the actual performance time and other performance information associated with the performance of the workload. The watcher (124) sends the feedback training data to the predictor (112) [11]. The predictor (112) then updates the second machine learning model using the feedback training data to generate an updated second machine learning model [12].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be implemented using instructions executed by one or more processors of the data management device. Further, such instructions may correspond to computer readable instructions that are stored on one or more non-transitory computer readable mediums.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining, by a processor of a first computing device, a workload, wherein the workload comprises training a deep learning model;
generating workload features associated with the workload;
obtaining hardware specification information associated with hardware of computing devices of a data cluster, wherein the first computing device is operatively connected to the data cluster;
executing, by the processor, a first machine learning model to determine compliant hardware configurations of the data cluster using the workload features and the hardware specification information, wherein the workload features comprise a deep learning model type associated with the deep learning model and workload properties associated with the deep learning model, and wherein the compliant hardware configurations meet requirements of the workload;
executing, by the processor, a second machine learning model to generate performance predictions associated with the compliant hardware configurations using the workload features and a portion of the hardware specification information associated with the compliant hardware configurations, wherein the performance predictions comprise predicted training times of the deep learning model on the compliant hardware configurations, wherein the first machine learning model is different than the second machine learning model;
generating a recommendation using the performance predictions, wherein the recommendation specifies a hardware configuration of the compliant hardware configurations; and
sending the recommendation to the data cluster, wherein the recommendation specifies a second computing device of the data cluster, and a second processor of the second computing device executes the workload using the recommendation.

2. The method of claim 1, further comprising:
following the sending of the recommendation to the data cluster:
obtaining, by the processor, feedback training data from the data cluster; and
updating the second machine learning model based on the feedback training data to generate an updated second machine learning model.

3. The method of claim 1, wherein generating the recommendation comprises:
identifying a set of compliant hardware configurations that meet a user requirement;
ranking the set of compliant hardware configurations based on a user preference to generate ranked compliant hardware configurations; and
generating the recommendation that specifies a top ranked compliant hardware configuration of the ranked compliant hardware configurations, wherein the top ranked compliant hardware configuration is the hardware configuration of the second computing device.

4. The method of claim 1, wherein the hardware specification information specifies components and component characteristics associated with the hardware of the computing devices of the data cluster.

5. The method of claim 1, wherein the first machine learning model is a neural network classification model.

6. The method of claim 1, wherein the second machine learning model is a neural network regression model.

7. The method of claim 1, wherein the workload properties associated with the deep learning model comprise one or more of: a complexity of the deep learning model, a number of convolution layers, a number of dense layers, a number of neurons per layer, a number of filters, a size of filters, and input and output sizes.

8. A system, comprising:
a data cluster comprising computing devices, wherein a first computing device of the computing devices comprises a processor and memory; and
a second computing device, operatively connected to the data cluster, comprising a second processor and second memory and configured to:
obtain a workload, wherein the workload comprises training a deep learning model;
generate workload features associated with the workload;

obtain hardware specification information associated with hardware of the computing devices;

execute a first machine learning model to determine compliant hardware configurations of the data cluster using the workload features and the hardware specification information, wherein the workload features comprise a deep learning model type associated with the deep learning model and workload properties associated with the deep learning model, and wherein the compliant hardware configurations meet requirements of the workload;

execute a second machine learning model to generate performance predictions associated with the compliant hardware configurations using the workload features and a portion of the hardware specification information associated with the compliant hardware configurations, wherein the performance predictions comprise predicted training times of the deep learning model on the compliant hardware configurations, wherein the first machine learning model is different than the second machine learning model;

generate a recommendation using the performance predictions, wherein the recommendation specifies a hardware configuration of the compliant hardware configurations; and send the recommendation to the first computing device, wherein the recommendation specifies the first computing device, and the processor of the first computing device executes the workload using the recommendation.

9. The system of claim 8, wherein the second computing device is further configured to:
following the sending of the recommendation to the data cluster:
obtain feedback training data from the data cluster; and
update the second machine learning model based on the feedback training data to generate an updated second machine learning model.

10. The system of claim 8, wherein generating the recommendation comprises:
identifying a set of compliant hardware configurations that meet a user requirement;
ranking the set of compliant hardware configurations based on a user preference to generate ranked compliant hardware configurations; and
generating the recommendation that specifies a top ranked compliant hardware configuration of the ranked compliant hardware configurations, wherein the top ranked compliant hardware configuration is the hardware configuration of the first computing device.

11. The system of claim 8, wherein the hardware specification information specifies components and component characteristics associated with the hardware of the computing devices.

12. The system of claim 8, wherein the first machine learning model is a neural network classification model.

13. The system of claim 8, wherein the second machine learning model is a neural network regression model.

14. The system of claim 8, wherein the workload properties associated with the deep learning model comprise one or more of: a complexity of the deep learning model, a number of convolution layers, a number of dense layers, a number of neurons per layer, a number of filters, a size of filters, and input and output sizes.

15. A non-transitory computer readable medium comprising computer readable program code, which when executed by a computer processor of a first computing device enables the computer processor to perform a method, the method comprising:
obtaining a workload, wherein the workload comprises training a deep learning model;
generating workload features associated with the workload;
obtaining hardware specification information associated with hardware of computing devices of a data cluster wherein the first computing device is operatively connected to the data cluster;
executing a first machine learning model to determine compliant hardware configurations of the data cluster using the workload features and the hardware specification information, wherein the workload features comprise a deep learning model type associated with the deep learning model and workload properties associated with the deep learning model, and wherein the compliant hardware configurations meet requirements of the workload;
executing a second machine learning model to generate performance predictions associated with the compliant hardware configurations using the workload features and a portion of the hardware specification information associated with the compliant hardware configurations, wherein the performance predictions comprise predicted training times of the deep learning model on the compliant hardware configurations, wherein the first machine learning model is different than the second machine learning model;
generating a recommendation using the performance predictions, wherein the recommendation specifies a hardware configuration of the compliant hardware configurations; and
sending the recommendation to the data cluster, wherein the recommendation specifies a second computing device of the data cluster, and a second processor of the second computing device executes the workload using the recommendation.

16. The non-transitory computer readable medium of claim 15, wherein the method further comprises:
following the sending of the recommendation to the data cluster:
obtaining feedback training data from the data cluster; and
updating the second machine learning model based on the feedback training data to generate an updated second machine learning model.

17. The non-transitory computer readable medium of claim 15, wherein generating the recommendation comprises:
identifying a set of compliant hardware configurations that meet a user requirement;
ranking the set of compliant hardware configurations based on a user preference to generate ranked compliant hardware configurations; and
generating a recommendation that specifies a top ranked compliant hardware configuration of the ranked compliant hardware configurations, wherein the top ranked compliant hardware configuration is the hardware configuration of the second computing device.

18. The non-transitory computer readable medium of claim 15, wherein the workload properties associated with the deep learning model comprise one or more of: a complexity of the deep learning model, a number of convolution layers, a number of dense layers, a number of neurons per layer, a number of filters, a size of filters, and input and output sizes.

19. The non-transitory computer readable medium of claim 15, wherein the hardware specification information specifies components and component characteristics associated with the hardware of the computing devices of the data cluster.

20. The non-transitory computer readable medium of claim 15, wherein the first machine learning model is a neural network classification model and the second machine learning model is a neural network regression model.

* * * * *